(12) United States Patent
Acker

(10) Patent No.: US 11,983,159 B2
(45) Date of Patent: May 14, 2024

(54) SYSTEMS AND METHODS FOR MANAGEMENT OF A LOG-STRUCTURE

(71) Applicant: Huawei Technologies Co., Ltd., Shenzhen (CN)

(72) Inventor: Ralph Acker, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 342 days.

(21) Appl. No.: 16/722,398

(22) Filed: Dec. 20, 2019

(65) Prior Publication Data
US 2020/0125553 A1   Apr. 23, 2020

Related U.S. Application Data

(63) Continuation of application No. PCT/EP2017/065180, filed on Jun. 21, 2017.

(51) Int. Cl.
*G06F 16/23* (2019.01)
*G06F 3/06* (2006.01)

(52) U.S. Cl.
CPC ........ *G06F 16/2365* (2019.01); *G06F 3/0604* (2013.01); *G06F 3/0638* (2013.01); *G06F 3/067* (2013.01); *G06F 16/2358* (2019.01)

(58) Field of Classification Search
CPC ............. G06F 16/2365; G06F 16/2358; G06F 3/0604; G06F 3/0638; G06F 3/067
See application file for complete search history.

(56) References Cited

U.S. PATENT DOCUMENTS 5,235,700 A * 8/1993 Alaiwan ............. G06F 11/2028
714/13
5,418,913 A * 5/1995 Fujimoto ................. G06F 5/065
707/999.104

(Continued)

FOREIGN PATENT DOCUMENTS

CN          1975728 A        6/2007
CN        104468505 A        3/2015

(Continued)

OTHER PUBLICATIONS

Lomet et al., "Transaction Timestamping in (Temporal) Databases", Proceedings of the 27th VLDB Conference (Year: 2001).*

(Continued)

*Primary Examiner* — Irete F Ehichioya
*Assistant Examiner* — Huen Wong
(74) *Attorney, Agent, or Firm* — Leydig, Voit & Mayer, Ltd.

(57) ABSTRACT

An apparatus manages a data storage device storing data entries. The apparatus includes the data storage device configured to store a log-structure comprising segments each storing data entries, each data entry including a data field storing data and a time parameter indicative of an age of the data stored in the data field, and a processor configured to modify data stored in the data field of a certain data entry of a certain segment of the log-structure, and update the time parameter of the certain data entry according to the modified data. Modifying the data stored in the data field of the segment of the log-structure improves computational performance in comparison to, for example, other methods that append new and/or modified data to the single log head of the log-structure, which causes contention for the concurrent write operations.

16 Claims, 6 Drawing Sheets

(56) References Cited

U.S. PATENT DOCUMENTS

| | | | |
|---|---|---|---|
| 6,889,231 B1* | 5/2005 | Souder | G06F 16/27 |
| 7,257,690 B1* | 8/2007 | Baird | G06F 11/1471 |
| | | | 714/E11.13 |
| 7,870,172 B1 | 1/2011 | Sarma | |
| 7,890,469 B1* | 2/2011 | Maionchi | G06F 16/10 |
| | | | 707/654 |
| 7,917,494 B2 | 3/2011 | Müller | |
| 8,655,878 B1* | 2/2014 | Kulkarni | G06F 16/7847 |
| | | | 707/747 |
| 9,460,008 B1 | 10/2016 | Leshinsky et al. | |
| 9,672,220 B2* | 6/2017 | Benjamin-Deckert | |
| | | | G06F 16/1774 |
| 9,715,519 B2* | 7/2017 | Atkisson | G06F 16/2365 |
| 9,747,222 B1* | 8/2017 | Armangau | G06F 11/1471 |
| 9,990,391 B1* | 6/2018 | Cole | G06F 16/2365 |
| 10,025,675 B2* | 7/2018 | Tomoda | G06F 11/1469 |
| 10,157,006 B1* | 12/2018 | Armangau | G06F 3/065 |
| 11,119,668 B1* | 9/2021 | Keller | G06F 3/064 |
| 2003/0004952 A1* | 1/2003 | Nixon | G05B 19/4145 |
| 2003/0055807 A1* | 3/2003 | Lomet | G06F 16/2322 |
| 2004/0030703 A1* | 2/2004 | Bourbonnais | G06F 16/2379 |
| 2005/0049945 A1* | 3/2005 | Bourbonnais | G06F 16/27 |
| | | | 705/30 |
| 2006/0075006 A1* | 4/2006 | Yu | G06F 16/2219 |
| 2007/0074159 A1* | 3/2007 | Ueno | G06F 40/166 |
| | | | 717/110 |
| 2008/0228834 A1* | 9/2008 | Burchall | G06F 11/2038 |
| 2009/0037422 A1* | 2/2009 | Wong | G06F 16/27 |
| 2009/0037494 A1* | 2/2009 | Wong | G06F 16/2358 |
| 2009/0119346 A1* | 5/2009 | Lu | G06F 16/273 |
| 2009/0125563 A1* | 5/2009 | Wong | G06F 16/256 |
| 2011/0010392 A1* | 1/2011 | Wong | G06F 16/2358 |
| | | | 707/776 |
| 2012/0166752 A1* | 6/2012 | Taniyama | G06F 3/0664 |
| | | | 711/170 |
| 2012/0310881 A1* | 12/2012 | Shadmon | G06F 16/273 |
| | | | 707/613 |
| 2013/0246395 A1* | 9/2013 | Charlet | G06F 16/289 |
| | | | 707/E17.014 |
| 2014/0279941 A1* | 9/2014 | Atkisson | G06F 12/0246 |
| | | | 707/690 |
| 2014/0358876 A1* | 12/2014 | Bhattacharjee | G06F 16/1873 |
| | | | 707/695 |
| 2015/0039573 A1* | 2/2015 | Bhattacharjee | G06F 16/2329 |
| | | | 707/693 |
| 2015/0058556 A1* | 2/2015 | Hamedani | G06F 3/0685 |
| | | | 711/114 |
| 2015/0134926 A1* | 5/2015 | Yang | G06F 3/0652 |
| | | | 711/167 |
| 2015/0154087 A1* | 6/2015 | Jin | G06F 3/0683 |
| | | | 714/15 |
| 2016/0070652 A1* | 3/2016 | Sundararaman | G06F 3/0665 |
| | | | 711/154 |
| 2016/0112516 A1* | 4/2016 | Liu | H04L 67/1097 |
| | | | 709/223 |
| 2016/0147797 A1* | 5/2016 | Dolph | G06F 16/215 |
| | | | 707/692 |
| 2017/0116089 A1* | 4/2017 | Park | G06F 16/128 |
| 2017/0116210 A1* | 4/2017 | Park | G06F 16/128 |
| 2017/0177658 A1* | 6/2017 | Lee | G06F 11/1451 |
| 2018/0307417 A1* | 10/2018 | Dubeyko | G06F 3/0652 |
| 2019/0278849 A1* | 9/2019 | Chandramouli | G06F 9/526 |
| 2022/0035788 A1* | 2/2022 | Aharoni | G06F 16/908 |

FOREIGN PATENT DOCUMENTS

| | | |
|---|---|---|
| CN | 104657364 A | 5/2015 |
| CN | 105940412 A | 9/2016 |
| EP | 3293636 A1 | 3/2018 |

OTHER PUBLICATIONS

Lee et al., "On-Demand Snapshot: An Efficient Versioning File System for Phase-Change Memory", IEEE Transactions on Knowledge and Data Engineering (Year: 2013).*

Vo et al., "LogBase: A Scalable Log-structured Database System in the Cloud," Proceedings of the VLDB Endowment, vol. 5, No. 10, pp. 1004-1015, XP055451765 (Jun. 30, 2012).

Garcia-Molina et al., "Database Systems: The Complete Book, Chapter 13—Secondary Storage Management," Second Edition, XP055305177, pp. 557-618, Pearson—Prentice Hall, Upper Saddle River, New Jersey (2009).

Rosenblum et al., "The Design and Implementation of a Log-Structured File System," ACM Transactions on Computer Systems, vol. 10, No. 1, pp. 26-52 (Feb. 1992).

Norvag et al., "Log-Only Temporal Object Storage," Database and Expert Systems Applications, 8th International Conference, DEXA '97, pp. 728-733, Institute of Electrical and Electronics Engineers, New York, New York (1997).

Rumble et al., "Log-structured Memory for DRAM-based Storage," Proceedings of the 12th USENIX Conference on File and Storage Technologies (FAST '14), pp. 1-16, USENIX Association (Feb. 17-20, 2014).

* cited by examiner

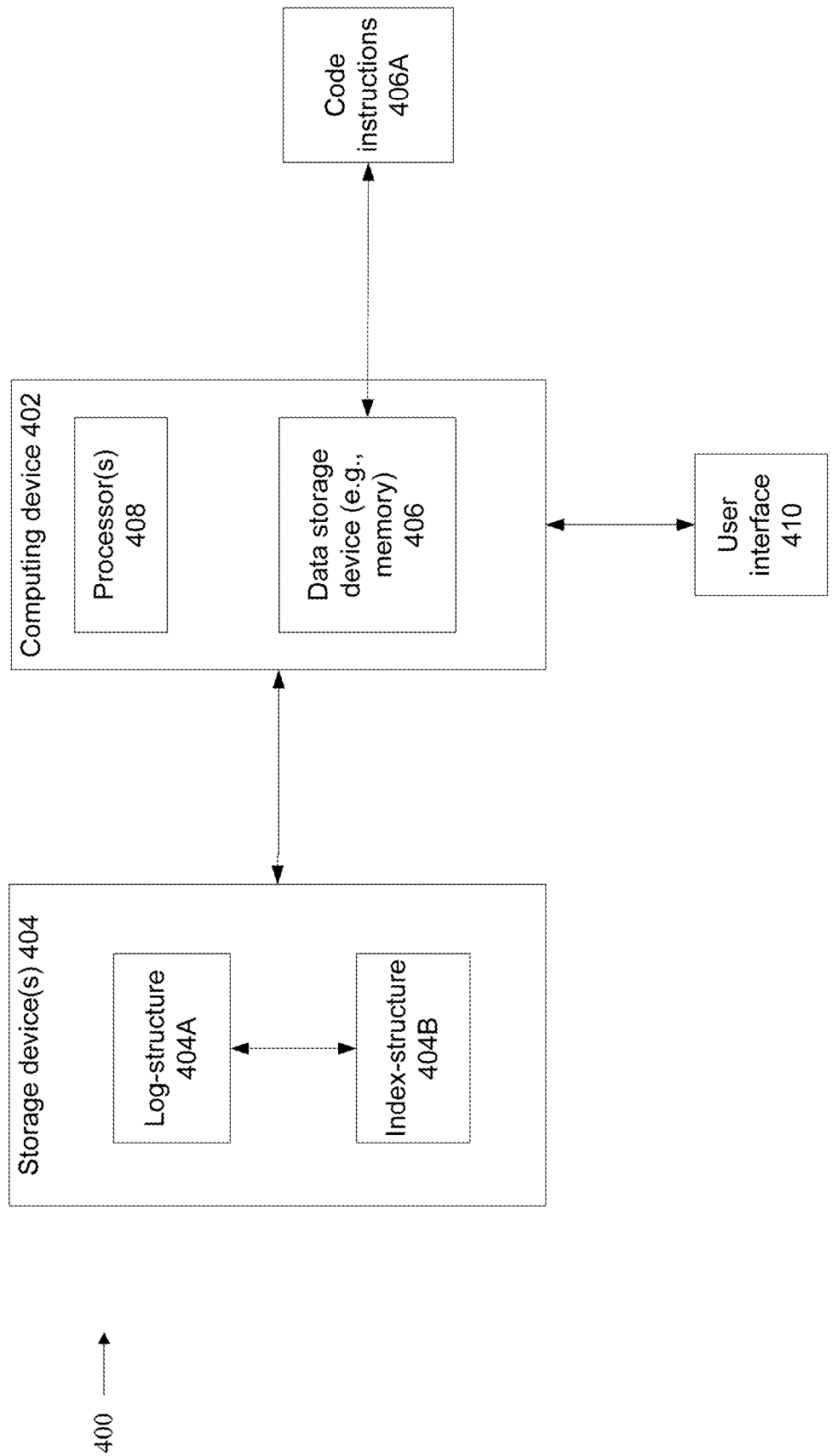

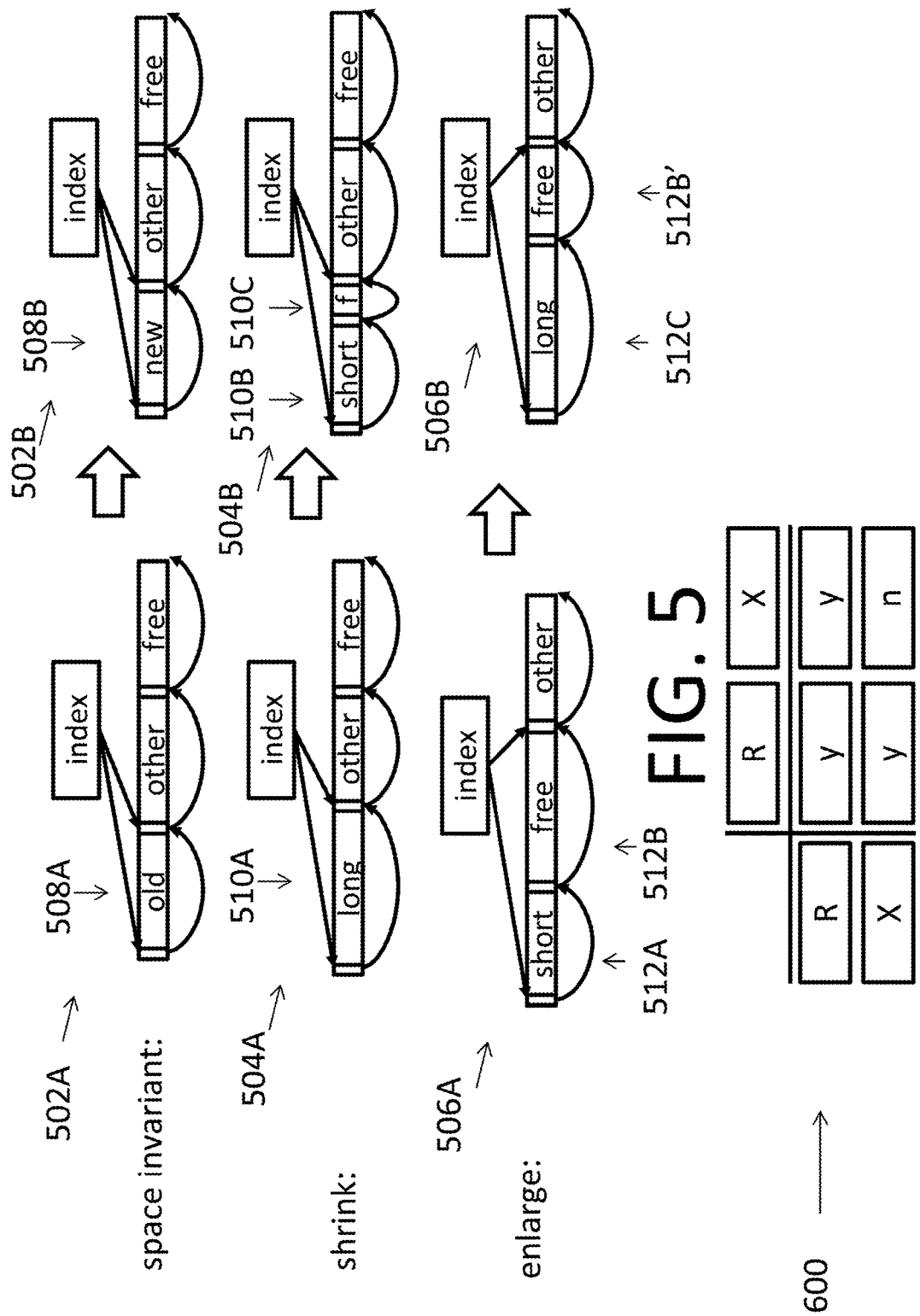

SYSTEMS AND METHODS FOR MANAGEMENT OF A LOG-STRUCTURE

CROSS-REFERENCE TO RELATED APPLICATIONS

This application is a continuation of International Application No. PCT/EP2017/065180, filed on Jun. 21, 2017, the disclosure of which is hereby incorporated by reference in its entirety.

FIELD

The present disclosure, in some embodiments thereof, relates to management of data entries and, more specifically, but not exclusively, to systems and methods for managing a log-structure storing data entries.

BACKGROUND

A log-structure is implemented as a sequence of arbitrary data entries, organized in segments that may be of fixed-size. The input-order preservation property of the log-structure provides several advantages to database systems:
- Redo-logging capabilities, which are useful for consistent query and online migration.
- Efficient multi-versioning, which provides direct support for concurrent transactions.
- Immutable data storage facilitates lockless read operations.

SUMMARY

The present disclosure provides an apparatus, a method, a computer program product, and a system for managing a log-structure storing segments of data entries.

According to a first aspect of the present disclosure, an apparatus for managing a data storage device storing data entries includes the data storage device configured to store a log-structure including segments each storing data entries, each data entry including a data field storing data and a time parameter indicative of an age of the data stored in the data field, and a processor configured to modify data stored in the data field of a certain data entry of a certain segment of the log-structure, and update the time parameter of the certain data entry according to the modified data.

According to a second aspect of the present disclosure, a method of managing a data storage device storing data entries includes modifying data stored in a data field of a certain data entry of a certain segment of a log-structure, and updating a time parameter of the certain data entry according to the modified data. The log-structure includes segments each storing data entries, each data entry including a data field storing data and a time parameter indicative of an age of the data stored in the data field.

Exemplary embodiments of systems, apparatus, methods, and/or code instructions described herein address a technical problem of improving computational efficiency of processing a log-structure during write-intensive workloads. Modifying the data stored in the data field of the segment of the log-structure (also referred to herein as in-place updates) improves computational performance (e.g., reduced processing time) in comparison to, for example, other methods that append new and/or modified data to the single log head of the log-structure, which causes contention for the concurrent write operations. The data stored in the data field is updated, improving processing and/or memory utilization (e.g., reduction in storage space and/or bandwidth), rather than bulk-copying the full entry to the log head (even when a small portion of the data is updated), which results in processor and/or memory overhead, which become significant during write-intensive workloads.

Modifying data stored in the data field of the segment of the log-structure prevents or reduces the creation and accumulation of outdated entries in the log-structure, in comparison to the approach of appending new and/or modified data to the log head of the log-structure. The memory space occupied by the outdated entries is reclaimed by a computationally expensive (e.g., in terms of processor utilization and/or processing time) log-structure cleaning process.

Modifying data stored in the data field of the segment of the log-structure preserves segment integrity at any time, such that accessing the segment by sequential scan for consistent query and online migration remains possible.

In a further implementation form of the first and second aspects of the present disclosure, the processor is configured to designate the certain data entry being read as pinned for reading access (R-Pin), where a concurrently executing process is granted read access to the certain data entry with R-Pin designation and denied write access to the certain data entry with R-Pin designation.

The R-Pin protects the certain data entry for concurrent reading. The R-Pin makes the entry temporarily immutable against concurrent updates. The R-Pin provides stable reading access to concurrent reading processes.

In a further implementation form of the first and second aspects of the present disclosure, when the concurrently executing process attempts to modify the certain data entry with R-Pin designation, the concurrently executing process is instructed to write the modified data as a new data entry to a log-head-segment located at the head of the log-structure.

In a further implementation form of the first and second aspects of the present disclosure, the method further includes, and/or the processor is configured to, update an index-structure indexing the log-structure according to the most recent time parameter of the new data entry at the log-head-segment.

In a further implementation form of the first and second aspects of the present disclosure, the method further includes, and/or the processor is configured to, designate the certain data entry being modified as pinned for exclusive write (X-Pin) access, where a concurrently executing process is denied write access to the certain data entry with X-Pin designation.

The X-Pin provides exclusive writing access to the certain data entry for concurrently committing a distributed transaction using a two-phase-commit (2PC) protocol. The X-Pin makes the entry temporarily immutable against concurrent updates.

In a further implementation form of the first and second aspects of the present disclosure, the method further includes, and/or the processor is configured to, update an index-structure indexing the log-structure according to the most recent time parameter of the committed certain data entry when the X-Pin designation is removed upon termination of the commit protocol.

In a further implementation form of the first and second aspects, the method further includes and/or the processor is configured to lock a certain index-structure entry and/or a data entry while the update operation is applied or pins are acquired.

In a further implementation form of the first and second aspects, when the modified data stored in the data field of the certain data entry is shorter than the unmodified data stored in the data field of the certain entry, the processor is configured to add a free space data entry to the certain segment corresponding to the difference in sizes between the modified data and the unmodified data.

Adding the free space data entry restores segment integrity. Other live data and/or other index entries are not modified. Locking of the index entry of the certain data entry and/or the certain data entry provides sufficient protection against concurrent writing.

In a further implementation form of the first and second aspects of the present disclosure, the method further includes, and/or the processor is configured to, compute an entry length parameter of the certain data entry according to the size of the modified data and write a value to the entry length parameter of the free space data entry according to the available free space computed based on the difference in sizes.

In a further implementation form of the first and second aspects of the present disclosure, when the modified data stored in the data field of the certain data entry is longer than the unmodified data stored in the data field of the certain entry, the method further includes, and/or the processor is configured to, write within the next sequential free space data entry.

Writing within the free space data entry of the next sequential data field restores segment integrity. Other live data and/or other index entries are not modified. Locking of the index entry of the certain data entry and/or the certain data entry provides sufficient protection against concurrent writing.

In a further implementation form of the first and second aspects of the present disclosure, the method further includes, and/or the processor is configured to, compute an entry length parameter of the certain data entry according to the size of the modified data and according to the remaining free space of the next sequential free space data field.

In a further implementation form of the first and second aspects of the present disclosure, the time parameter includes one or more of: a version parameter indicative of the version of the data stored in the data field of the certain data entry, and a timestamp indicative of the time that the data was stored in the data field of the certain data entry.

In a further implementation form of the first and second aspects of the present disclosure, the data storage device stores an index-structure mapping a unique key associated with each data entry of the log-structure to the corresponding data entry's storage location on the log-structure, and where the data stored in the data field of the certain data entry is modified without updating the mapping of the index-structure to other data entries and without updating other data entries on the log-structure.

In a further implementation form of the first and second aspects of the present disclosure, the method further includes and/or the processor is configured to designate the entire log-structure for strict logging for permitting sequential read access, where a concurrently executing process is granted read access and denied in-place write access to the log-structure.

In a further implementation form of the first and second aspects of the present disclosure, when the concurrently executing process attempts to modify the certain data entry while strict logging is required, the concurrently executing process is instructed to write the modified data as a new data entry to a log-head-segment located at the head of the log-structure.

Appending of new and/or modified data to the log-head of the log-structure (based on other methods) may be activated temporarily, on demand, for example, during data scanning and/or data migration. The appending of new and/or modified data to the log-head (based on other methods) is deactivated in certain scenarios (e.g., when no scans and/or migrations are active) and modifying data stored in the data field of the segment of the log-structure is implemented to improve computational performance (e.g., reduction of processor utilization, processing time, and/or data storage requirements).

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIG. 4 is a block diagram of components of a system for managing one or more log-structures based on modification of the data stored in the data field of a certain data entry of a certain segment of log-structure, in accordance with some embodiments of the present disclosure;

FIG. 5 is a graphical representation of the process of a space invariant in-place modification, a graphical representation of the process of shrinking a data entry to accommodate a data modification shorter than the certain data field, and a graphical representation of the process of modifying the next sequential data field to accommodate a data modification longer than the certain data field, in accordance with some embodiments of the present disclosure;

FIG. 6 is a chart depicting an R-Pin and X-Pin compatibility matrix, in accordance with some embodiments of the present disclosure.

DETAILED DESCRIPTION

Figure 1:
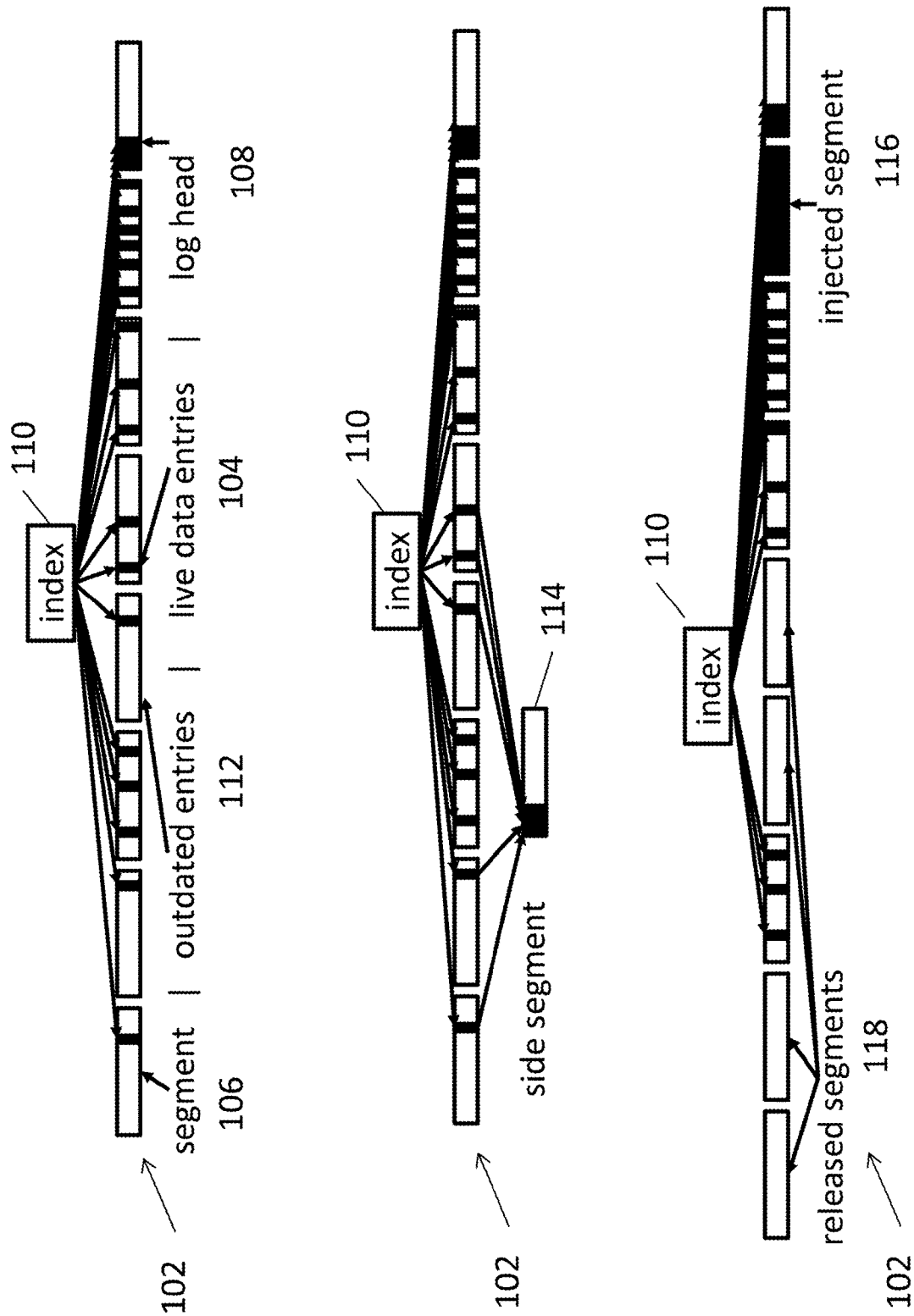
FIG. 1 is a schematic depicting an implementation of a log-structure, useful for helping to understand some embodiments of the present disclosure.

The present disclosure, in some embodiments thereof, relates to management of data entries and, more specifically, but not exclusively, to systems and methods for managing a log-structure storing data entries.

As used herein, the term modifying data means changing the existing data, and/or deleting the existing data, and/or writing new data (optionally over the existing data).

An aspect of some embodiments of the present disclosure relates to a system, an apparatus, a method, and/or code instructions (stored in a data storage device executable by one or more processors) for modifying data stored in a data field of a data entry of a segment of a log-structure, also referred to herein as in-place update or modification. The time parameter indicative of an age of the data stored in the data field, associated with the data entry, is updated according to the modified data.

Optionally, the data entry being read is designated as pinned for reading access (denoted herein as R-Pin). A concurrently executed process is granted read access to the data entry with R-Pin designation and denied write access to the data entry with R-Pin designation. Alternatively or additionally, the data entry being modified is designated as pinned for exclusive write access (denoted herein as X-Pin). A concurrently executing process is denied write access to the data entry with X-Pin designation.

Optionally, when the modified data stored in the data field of the data entry is shorter than the unmodified data stored in the data field of the entry, a free space data entry is added to the segment. Alternatively, when the modified data stored in the data field of the data entry is longer than the unmodified data stored in the data field of the entry, the free space data entry of the next sequential data field is overwritten.

The modification of the data is performed without updating other data entries of the log-structure, and without updating the mapping of an index-structure (mapping a unique key associated with each data entry of the log-structure to the corresponding data entry's storage location on the log-structure) to other data entries.

The systems, apparatus, methods, and/or code instructions described herein address the technical problem of improving computational efficiency of processing a log-structure during write-intensive workloads. Modifying the data stored in the data field of the segment of the log-structure (also referred to herein as in-place updates) improves computational performance (e.g., reduced processing time) in comparison to, for example, other methods that append new and/or modified data to the single log head of the log-structure, which causes contention for the concurrent write operations. The data stored in the data field is updated, improving processing and/or memory utilization (e.g., reduction in storage space and/or bandwidth), rather than bulk-copying the full entry to the log head (even when a small portion of the data is updated) which results in processor and/or memory overhead, which become significant during write-intensive workloads.

Modifying data stored in the data field of the segment of the log-structure prevents or reduces the creation and accumulation of outdated entries in the log-structure, in comparison to the approach of appending new and/or modified data to the log head of the log-structure. The memory space occupied by the outdated entries is reclaimed by a computationally expensive (e.g., in terms of processor utilization and/or processing time) log-structure cleaning process.

Modifying data stored in the data field of the segment of the log-structure preserves segment integrity at any time, such that accessing the segment by sequential scan for consistent query and online migration remains possible.

Before explaining at least one exemplary embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may pertain to a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various exemplary embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic depicting an implementation of a log-structure 102, useful for helping to understand some embodiments of the present disclosure. Log-structure 102 includes a sequence of data entries, i.e., live data (one entry 104 shown for clarity of explanation) organized in storage entities of fix-sized segments (one segment 106 shown for clarity of explanation). New data is appended to a log head 108. When each segment is closed, the segment is immutable. An index structure 110 accesses the data entries stored in log-structure 102. When data entries are updated, index structure 110 is adjusted to point to the new version at log head 108.

As new data is added over time, partially replacing old data, log-structure 102 accumulates outdated entries 112, i.e., dead data. A garbage collection process selects sparse segments that store mostly dead data. Live data entries are moved to a side segment 114. Index structure 110 is updated accordingly.

When side segment 114 is full with moved live data entries, side segment 114 is appended as an injected segment 116 to log head 108. Emptied segments 118, from which the live data entries have been moved and that include only dead data, are removed from log-structure 102. Effectively, log-structure 102 stores the same data entries before and after the exchange of segments.

Concurrency of the garbage collection process and append operations are synchronized on index structure 110 and log head 108.

Data entries are continuously moved and reordered within log-structure 102, which are processor intensive operations.

Figure 2:
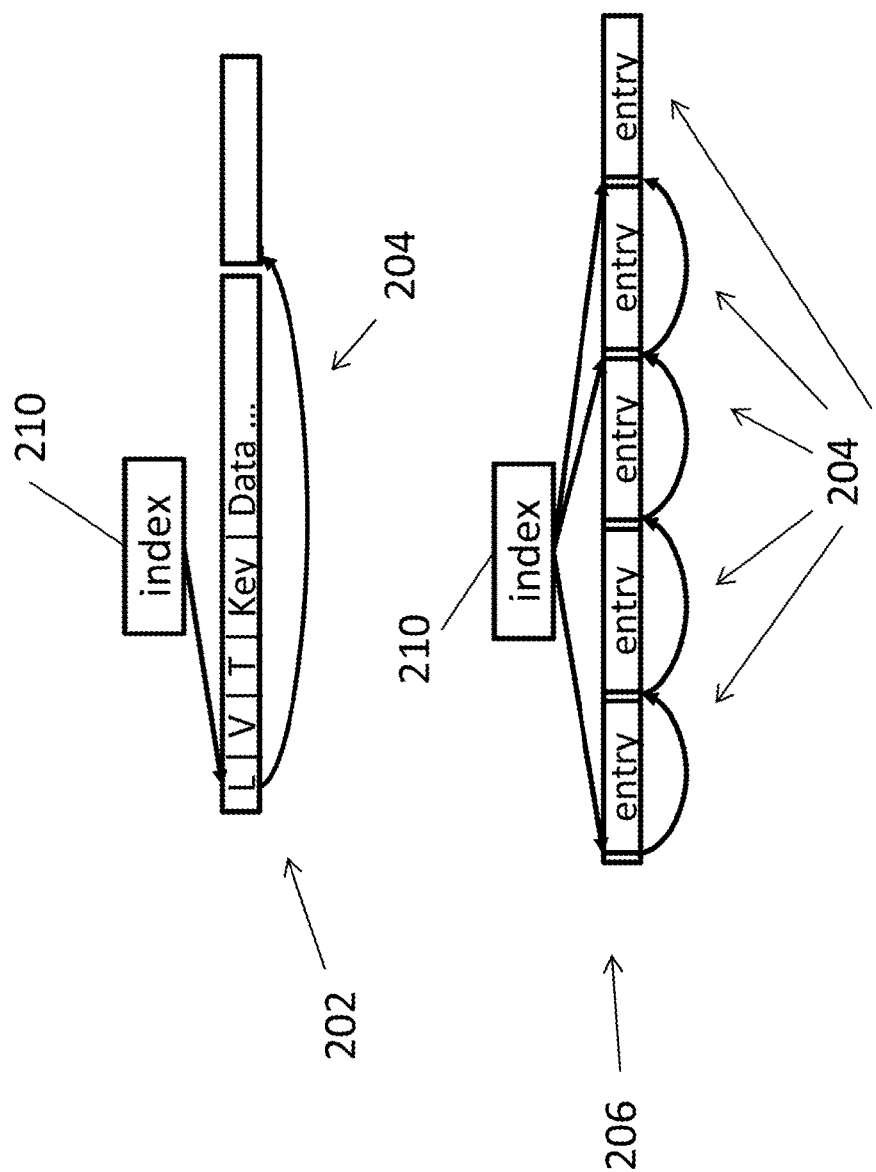
FIG. 2 is a schematic depicting an exemplary implementation of a log-structure, useful for helping to understand some embodiments of the present disclosure.

Reference is now made to FIG. 2, which is a schematic depicting an exemplary implementation of a log-structure 202, useful for helping to understand some embodiments of the present disclosure. Each data entry 204 stored in a segment includes a metadata header, storing the parameters L, V, T, Key, and Data. L denotes the length of the associated data entry. V denotes the version of the associated data entry. T denotes a timestamp of the associated data entry. Key denotes the unique entry key, which is used for lookup by index structure 210. Data denotes the live data stored in the associated data entry.

Each segment 206 stores a sequence of data entries 204. Data entries 204 are iterated by using the previous data entry's length to compute the beginning of the next data entry. A certain data entry is active when a lookup in index structure 210 using the key of the certain data entry points to the beginning of the certain data entry. Even in the presence of inactive data entries, segment integrity is preserved, and iterating of segments is possible.

Figure 3:
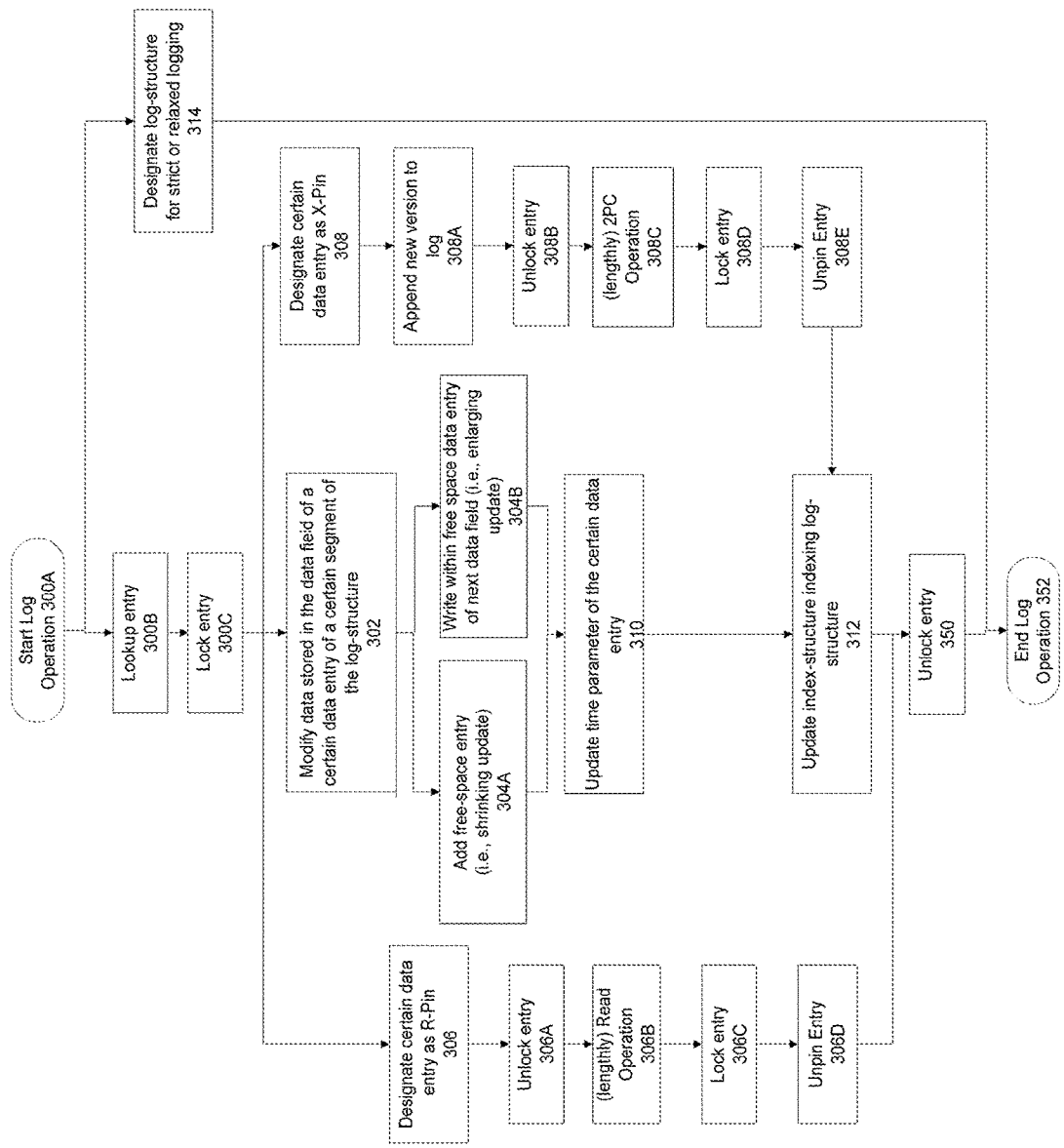
FIG. 3 is a flowchart of a method of managing a log-structure storing data entries, based on modification of the data stored in the data field of a certain data entry of a certain segment of the log-structure, in accordance with some embodiments of the present disclosure.

Reference is now made to FIG. 3, which is a flowchart of a method of managing a log-structure storing data entries, based on modification of the data stored in the data field of a certain data entry of a certain segment of the log-structure, in accordance with some embodiments of the present disclosure. Reference is also made to FIG. 4, which is a block diagram of components of a system 400 that includes a computing device 402 for managing one or more log-structures 404A stored in one or more storage devices 404 and/or 406 based on modification of the data stored in the data field of a certain data entry of a certain segment of log-structure 404A, in accordance with some embodiments of the present disclosure.

Log-structure 404A includes segments, each storing one or more data entries. Each data entry includes a data field storing data, and optionally a time parameter indicative of age of the data stored in the data field. The time parameter may be implemented as, for example, a version parameter indicative of the version of the data stored in the data field of the data entry, and/or a timestamp indicative of the time that the data was stored in the data field of the data entry. It is noted that the time parameter may be stored in another data structure that maps to the data entries of the log-structure.

Index-structure 404B (optionally stored in storage device 404 and/or stored in data storage device 406) maps a unique key associated with each data entry of the log-structure 404A to the corresponding data entry's storage location on the log-structure. As described herein, the data stored in the data field of the certain data entry is modified without updating the mapping of index-structure 404B to other data entries and without updating other data entries on the log-structure 404B.

Computing device 402 may be implemented as, for example, one or more of: a single computing device, a group of computing devices arranged in parallel, a computing cloud, a virtual machine, a network server, a storage server, a local server, a remote server, a client terminal, a mobile device, a stationary device, a kiosk, a smartphone, a laptop, a tablet computer, a wearable computing device, a glasses computing device, a watch computing device, and a desktop computer.

Storage device(s) 404 may be integrated with computing device 402, for example installed within computing device 402, for example, data storage device(s) 404 is installed within a physical box implementation of computing device 402. Storage device(s) 404 may be used exclusively by computing device 402, and located externally to computing device 402, for example, an external hard drive, and/or remote storage server. Storage device(s) 404 may be shared by computing device 402 and/or installed within another computing system (not shown), for example, within a network. Storage device(s) 404 communicates with computing device 402, for example, by a local bus, over a network, over a direct link, over a wireless, and/or over a wire.

Storage device 404 may store index-structure 404B that indexes log-structure 404A.

Exemplary storage device(s) 404 include one or more of: cache, random access memory (RAM), solid state drive (SSD), hard disk drive (HDD), a removable storage unit, a remote storage device, a computing cloud, non-volatile memory, magnetic media, semiconductor memory devices, hard drive, removable storage, and optical media. It is noted that storage device 404 may be integrated and/or interchanged with data storage device 406, and/or storage device 404 may be implemented as a unique component separate from data storage device 406.

Computing device 402 includes one or more processors 408, implemented as for example, central processing unit(s) (CPU), graphics processing unit(s) (GPU), field programmable gate array(s) (FPGA), digital signal processor(s) (DSP), application specific integrated circuit(s) (ASIC), customized circuit(s), processors for interfacing with other units, and/or specialized hardware accelerators. Processor(s) 408 may be implemented as a single processor, a multi-core processor, and/or a cluster of processors arranged for parallel processing (which may include homogenous and/or heterogeneous processor architectures). It is noted that processor(s) 408 may be designed to implement in hardware one or more features stored as code instructions 406A.

Data storage device (e.g., memory) 406 stores code instructions executable by processor(s) 408, optionally as code instructions 406A that implement one or more acts of the method described with reference to FIG. 3. Memory 406 may be implemented as for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Computing device 402 may be in communication with a user interface 410 that presents data to a user and/or includes a mechanism for entry of data, for example, one or more of: a touch-screen, a display, a keyboard, a mouse, voice activated software, and a microphone.

Referring now back to FIG. 3, at 300A, the log operation process starts.

At 300B, a lookup is performed in index-structure 404B, to determine the location of the certain data entry to be modified within the segments of the log-structure 404A.

At 300C, the identified entry is locked. Three operations may be performed on the identified entry.

In a first operation, at 302, data stored in the data field of a certain data entry of a certain segment of log-structure 404A is modified, for example, modified data is written into the data field, new data is written over existing data, existing data is deleted, and/or existing data is changed.

Space-invariant updates are performed directly in-place.

The data stored in the data field is modified in-place, in contrast to other methods that append new data to the log-head of the log-structure.

The in-place update is performed without necessarily including the integrity of log-structure 404A. Index-structure 404B is not updated, apart from updating the index entry related to the modified data, for example, updates related to other data entries, which would otherwise be performed when other methods such as appending to the log-head are employed, are avoided.

It is noted that, when one or more conditions described herein for performing the in-place modification are not met, the modified data may be appended to the log-head of log-structure 404A based on standard methods.

At 304A, when the modified data stored in the data field of the certain data entry being accessed for modification is shorter than the unmodified data (i.e., the original existing data) stored in the data field of the certain entry (also referred to herein as a shrinking update), a free space data entry is added to the segment associated with the data entry. The free space data entry may be added sequentially after the data entry storing the modified data. The size of the free space data entry corresponds to the difference in size between the modified data and the unmodified data (i.e., the original existing data).

Adding the free space data entry restores segment integrity. Other live data entries and/or other index entries (i.e., apart from the data entry storing the modified data and/or the free space data entry) are not modified. Locking of the index entry of the certain data entry and/or the certain data entry provides sufficient protection against concurrent writing.

The data stored in the data field is modified in-place, in contrast to other methods that append new data to the log-head of the log-structure. The metadata of the data entry is updated, for example, the time parameter is updated according to the modified data.

Each data entry may store and/or be associated with an entry length parameter denoting the size of the data stored in the data field of the data entry. The length parameter may be stored as a metadata field of each respective data entry. Optionally, the entry length parameter of the data entry is computed according to the size of the modified data. A value is written to the entry length parameter of the free space data entry according to the available free space computed based on the difference in sizes. The entry length parameter of the free space data entry denotes the amount of available storage space within the free space data entry.

Alternatively, at 304B, when the modified data stored in the data field of the certain data entry is longer than the unmodified data (i.e., the original existing data) stored in the data field of the certain entry (also referred to herein as an enlarging update), the additional modified data that is unable to fit within the space of the existing data is written within the free space data entry of the next sequential data field. It is noted that next free space data entry may refer to one individual free data entry or a sequence of free data entries which can be coalesced into one free data entry. The size of the data entry is enlarged with the free space available in the next sequential data entry, to accommodate the modified data. The entry length parameter of the certain data entry is computed according to the size of the modified data and according to the remaining free space of the next sequential free space data field.

Writing within the free space data entry of the next sequential data field restores segment integrity. Other live data and/or other index entries (i.e., apart from the data entry storing the modified data and/or the free space data entry) are not modified. Locking of the index entry of the certain data entry and/or the certain data entry provides sufficient protection against concurrent writing.

The data stored in the data field is modified in-place, in contrast to other methods that append new data to the log-head of the log-structure. The metadata of the data entry is updated, for example, the time parameter is updated according to the modified data.

Reference is now made to FIG. 5, which includes a graphical representation 502A-B of the process of a space invariant in-place modification (as described with reference to block 302 of FIG. 3), a graphical representation 504A-B of the process of shrinking a data entry to accommodate a data field which after modification is shorter than the certain data field prior to modification (as described with reference to block 304A of FIG. 3), and a graphical representation 506A-B of the process of modifying the next unused sequential data field to accommodate a data field which after modification is longer than the certain data field prior to modification (as described with reference to block 304B of FIG. 3), in accordance with some embodiments of the present disclosure. It is noted that the mapping of the index data structure to the data entries of the log-structure remains unaffected by the modifications (i.e., the index is not updated).

At 502A-B, an old data field 508A of the log-structure is replaced with a new data field 508B of the same size. Segment integrity is not affected.

At 504A-B, a long data field 510A of the log-structure is replaced with a short data field 510B having a length less than the long data field, and with a free space f510C. The sum of short data field 510B size and free space f510C is equal to the size of long data field 510A. The integrity of the segment storing long data field 510A is restored by adding a free space f 510C.

At 506A-B, a short data field 512A and a free space data field 512B are replaced with a long data field 512C and with a reduction in size of free space data field 512B'. The sum of short data field 512A size and free space data field 512B is equal to the sum of long data field 512C size and reduced size of free space data field 512B'. The integrity of the data segment storing short data field 512A is restored by adapting free space data field 512B into reduced size free space data field 512B'.

Referring now back to FIG. 3, at 310, the time parameter of the certain data entry is updated according to the modified data. The metadata of the data entry is updated, for example, the time parameter is updated according to the time at which the data is modified, and/or the version parameter is updated according to the version of the modified data.

At 312, index-structure 404B is updated accordingly.

At 350, the entry is unlocked.

At 352, the log operation ends.

Alternatively, in another operation on the log, at 306, the certain data entry is designated as pinned for reading access (R-Pin) and unlocked (306A). A concurrently executing process is granted read access to the certain data entry with R-Pin designation. The concurrently executing process is denied write access to the certain data entry with R-Pin designation.

The R-Pin protects the certain data entry for concurrent reading (306B). Since data is actually being overwritten, a concurrently executing process and/or thread accessing the data entry while the data entry is being modified causes the concurrently executing process to read inconsistent data. The R-Pin makes the entry temporarily immutable against concurrent updates. The R-Pin provides stable reading access to concurrent reading process(es).

When the concurrently executing process attempts to modify the certain data entry with R-Pin designation, the concurrently executing process is instructed to write the modified data as a new data entry to the log-head segment located at the head of log-structure 404A. Index-structure 404B is updated to point to the location of the new data entry at the log-head segment of log-structure 404A.

The index entry of the certain data entry and/or the certain data entry being modified is locked (306C). Locking provides sufficient protection against concurrent writing.

When the R-Pin designation is removed from the certain data entry (306D) and modified data originally designated to be written to the certain data entry has been written to the log-head of log structure 404A instead, the storage space within the certain data entry is designated as free space.

Alternatively, in yet another operation on the log, at 308, the certain data entry being modified is designated as pinned for exclusive write (X-Pin) access. A new version is appended to the log (308A). The entry is unlocked (308B) and a concurrently executing process is denied write access to the certain data entry with X-Pin designation. The X-Pin provides exclusive writing access to the certain data entry for concurrently committing a distributed transaction using a two-phase-commit (2PC) protocol (308C). The X-Pin makes the entry temporarily immutable against concurrent updates. The index entry of the certain data entry and/or the certain data entry being modified is locked (306D). Locking provides sufficient protection against concurrent writing. The X-pin is removed (i.e., unpinned) from the entry (308E).

Reference is now made to FIG. 6, which is a chart depicting an R-Pin and X-Pin compatibility matrix, in accordance with some embodiments of the present disclosure. R denotes R-Pin, X denotes X-Pin, y denotes a compatibility, and n denotes lack of compatibility. According to the matrix, the following combinations are compatible: R-Pin and R-Pin, R-Pin and X-Pin, and X-Pin and R-Pin. The combination of X-Pin and X-Pin is incompatible.

Referring now back to FIG. 3, at 312, index-structure 404B is updated accordingly.

As discussed with reference to block 306, when the concurrently executing process attempts to modify the certain data entry with R-Pin designation, the concurrently executing process is instructed to write the modified data as a new data entry to the log-head segment located at the head of log-structure 404A. Index-structure 404B is updated to point to the location of the new data entry at the log-head segment of log-structure 404A. Index-structure 404B is updated according to the most recent time parameter of the new data entry at the log-head-segment.

When execution of block 308 (and 308A-E) completes, index-structure 404B is updated to map to the newest committed version of the data (312). When the X-Pin designation is removed from the certain data entry, optionally upon termination of the commit protocol, the index-structure 404B is redirected accordingly, optionally according to the most recent time parameter of the committed certain data entry.

Alternatively to performing one of the three log operations (302, 306, 208), at 314, optionally, log-structure 404A is designated for strict or relaxed logging. Strict logging may be switched on demand, for example, by code instructions. During the strict logging designation, a concurrently executing process is granted read access and denied write access to the log-structure. When the concurrently executing process attempts to modify the certain data entry while strict logging is designated, the concurrently executing process is instructed to write the modified data as a new data entry to the log-head segment located at the head of the log-structure 404A.

Log-structure 404A may be designated for strict logging for permitting sequential read access, for example, supporting sequential scan operations for query, data migration in a distributed computing system, and/or other applications. Code instructions detecting the sequential read access operations may switch to strict logging.

Appending of new and/or modified data to the log-head of the log-structure (based on other methods) may be activated temporarily, on demand, for example, during data scanning and/or data migration. The appending of new and/or modified data to the log-head (based on other methods) is deactivated in certain scenarios (e.g., when no scans and/or migrations are active) and modifying data stored in the data field of the segment of the log-structure is implemented to improve computational performance (e.g., reduction of processor utilization, processing time, and/or data storage requirements).

Figure 7:
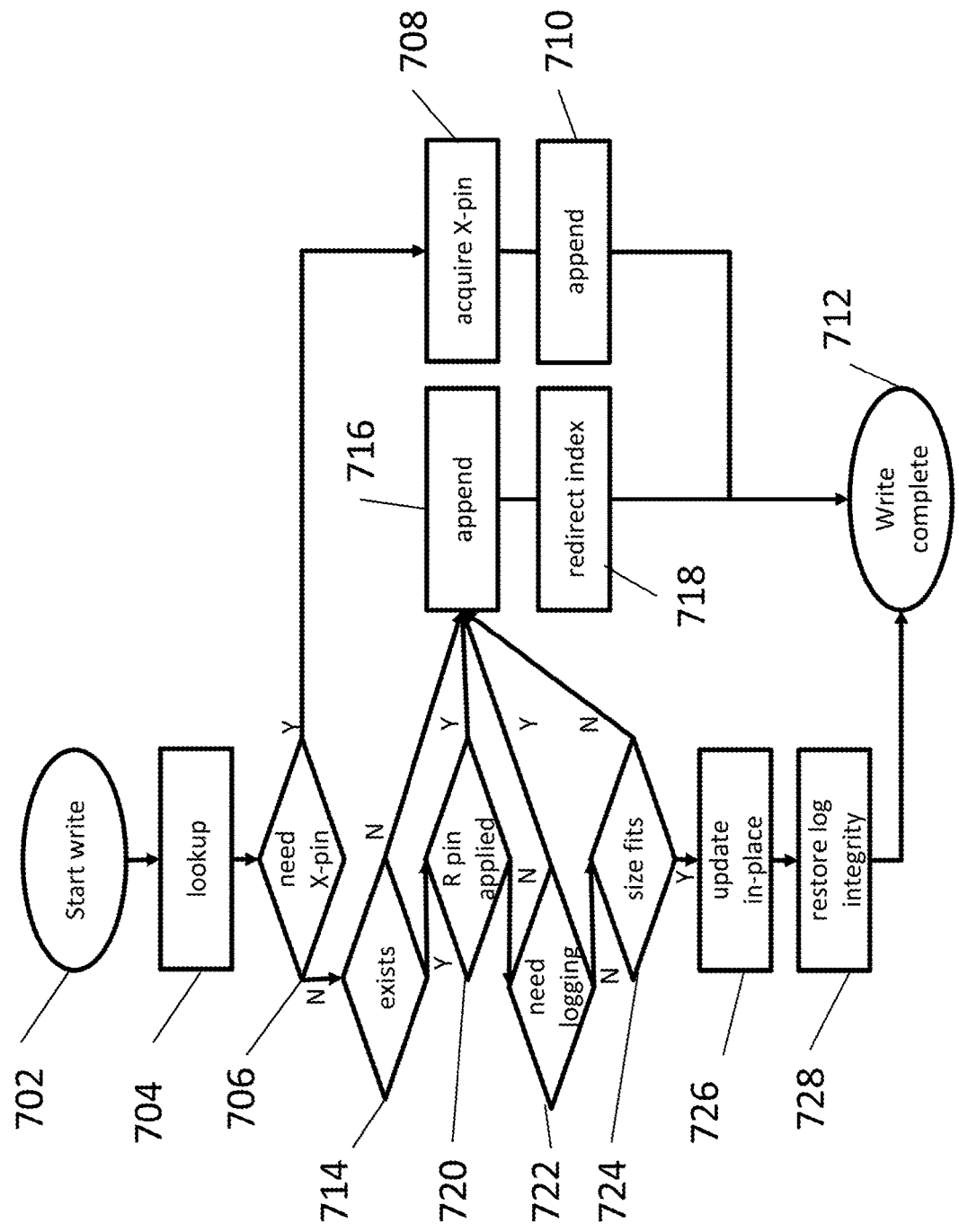
FIG. 7 is a flowchart of an exemplary decision process of whether a data modification is applied in-place, or whether the modified data is appended to the log-head of the log-structure, in accordance with some embodiments of the present disclosure.

Reference is now made to FIG. 7, which is a flowchart of an exemplary decision process of whether a data modification is applied in-place, or whether the modified data is appended to the log-head of the log-structure, in accordance with some embodiments of the present disclosure. The decision process described with reference to FIG. 7 may include and/or be based on one or more acts described with reference to FIG. 3. The decision process described with reference to FIG. 7 is implemented by processor(s) 408 of computing device 402 executing code instructions 406A stored in memory 406, as described with reference to FIG. 4.

At 702, the process of writing to log-structure 404A starts.

At 704, a lookup is performed in index-structure 404B, to determine the location of the certain data entry to be modified within the segments of the log-structure 404A.

At 706, a decision is made as to whether the certain data entry is to be designated as X-Pin, for example, when a concurrently committing distributed transaction (e.g., based on the 2-phase commit protocol) is executed. At 708, the certain data entry acquires X-Pin designation. At 710, the modified data is appended to the log-head of log-structure 404A, and the write operation terminates at 712. Blocks 706, 708, and 710 may be implemented according to block 308 described with reference to FIG. 3

Alternatively, when the certain data entry is not designated as X-Pin, at 714, a decision is made whether the certain data entry exists within log-structure 404A. At 716, when the certain data entry does not exist, the modified data is appended to the log-head of log-structure 404A. At 718, index-structure 404B is redirected to the appended modified data, and the write operation terminates at 712.

Alternatively, when the certain data entry exists within log-structure 404A, a decision is made whether the certain data entry has been designated as R-Pin, for example, when concurrent reading processes are executing. Acquiring R-pin for concurrent reading may be implemented according to block 306 described with reference to FIG. 3. At 716, when the certain data entry is designated as R-Pin, the modified data is appended to the log-head of log-structure 404A. At 718, index-structure 404B is redirected to the appended modified data, and the write operation terminates at 712. Block 718 may be implemented according to block 312 described with reference to FIG. 3

Alternatively, when the certain data entry is not designated as R-Pin, at 722, a decision is made as to whether the modified data is to be logged to log-structure 404A based on standard methods, by appending to the log-head segment. At 716, the modified data is appended to the log-head of log-structure 404A. At 718, index-structure 404B is redirected to the appended modified data, and the write operation terminates at 712.

Alternatively, when an in-place modification is selected, at 724 an analysis is performed to determine whether the data field of the certain data entry is long enough to accommodate the modification of the data, and/or whether the next sequential data entry (or entries) includes sufficient free space to accommodate the modification of the data. At 716, when sufficient space is lacking to accommodate the modified data, the modified data is appended to the log-head of log-structure 404A. At 718, index-structure 404B is redirected to the appended modified data, and the write operation terminates at 712.

Alternatively, at 726, when the certain data entry and/or the next sequential data entry are able to accommodate the modified data, an in-place update is performed, as described with reference to blocks 302, 304A, and/or 304B of FIG. 3.

At 728, the integrity of log-structure 404A is restored by adding and/or adapting the free entry as described with reference to blocks 304A and/or 304B of FIG. 3, and the write operation terminates at 712.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant log-structures will be developed and the scope of the term log-structure is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. An apparatus for managing a data storage device storing data entries, the apparatus comprising:
   the data storage device storing a log-structure, the log-structure comprising a log head and segments each storing data entries, each data entry of the data entries comprising a data field storing data and a time parameter indicative of an age of the data stored in the data field; and
   a processor configured to:
   receive an instruction to modify the data stored in the data field of a certain data entry, of the data entries, of a certain data segment, of the segments, of the log-structure;
   perform a lookup in an index-structure to determine a location of the certain data entry to be modified within the segments of the log-structure;
   determine whether a length of the data field of the certain data entry is sufficiently long to accommodate a modification, and if it is determined that the length of the data field is not sufficiently long, determine whether a next sequential data entry includes sufficient free space to accommodate the modification;
   upon determining that the length of the data field of the certain data entry is sufficiently long or the next sequential data entry includes sufficient free space, execute an in-place modification by writing over existing data or changing the existing data with modified data without appending the modified data to the log head of the log-structure, the existing data being stored in the data field associated with the determined location of the certain data entry of the certain segment of the log-structure prior to the modification;
   upon determining that the length of the data field of the certain data entry is not sufficiently long and the next sequential data entry does not include sufficient free space, append the modified data to the log head of the log-structure; and
   update the time parameter of the certain data entry and/or the time parameter of the next sequential data entry according to the modified data.

2. The apparatus according to claim 1, wherein the processor is configured to designate a second certain data entry, of the data entries, being read as pinned for reading access (R-Pin), wherein a concurrently executing process is granted read access to the second certain data entry with R-Pin designation and denied write access to the certain data entry with R-Pin designation.

3. The apparatus according to claim 2, wherein, when the concurrently executing process attempts to modify the second certain data entry with R-Pin designation, the concurrently executing process is instructed to write the modified data as a new data entry to the log head of the log-structure.

4. The apparatus according to claim 3, wherein the processor is configured to update an index-structure indexing the log-structure according to the most recent time parameter of the new data entry at the log head.

5. The apparatus according to claim 1, wherein the processor is configured to designate the certain data entry being modified as pinned for exclusive write (X-Pin) access, wherein a concurrently executing process is denied write access to the certain data entry with X-Pin designation.

6. The apparatus according to claim 5, wherein the processor is configured to update an index-structure indexing the log-structure according to the most recent time parameter of the committed certain data entry when the X-Pin designation is removed upon termination of the commit protocol.

7. The apparatus according to claim 1, wherein, when the modified data stored in the data field of the certain data entry is shorter than unmodified data stored in the data field of the certain entry, the processor is configured to add a free space data entry to the certain segment corresponding to a difference in sizes between the modified data and the unmodified data.

8. The apparatus according to claim 7, wherein the processor is configured to compute an entry length parameter of the certain data entry according to a size of the modified data and write a value to the entry length parameter of the free space data entry according to an available free space computed based on the difference in sizes.

9. The apparatus according to claim 1, wherein, when the modified data stored in the data field of the certain data entry is longer than unmodified data stored in the data field of the certain entry, the processor is configured to write within the next sequential free space data entry.

10. The apparatus according to claim 9, wherein the processor is configured to compute an entry length parameter of the certain data entry according to a size of the modified data and according to the remaining free space of a next sequential free space data field.

11. The apparatus according to claim 1, wherein the time parameter comprises one or more of: a version parameter indicative of a version of the data stored in the data field of the certain data entry, or a timestamp indicative of a time that the data was stored or modified in the data field of the certain data entry.

12. The apparatus according to claim 1, wherein the data storage device is configured to store an index-structure mapping a unique key associated with each data entry of the log-structure to the corresponding data entry's storage location on the log-structure, and wherein the data stored in the data field of the certain data entry is modified without updating the mapping of the index-structure to other data entries and without updating other data entries on the log-structure.

13. The apparatus according to claim 1, wherein the processor is configured to designate the entire log-structure for strict logging for permitting sequential read access, wherein a concurrently executing process is granted read access and denied in-place write access to the log-structure.

14. The apparatus according to claim 2, wherein, when the concurrently executing process attempts to modify a second certain data entry while strict logging is required, the concurrently executing process is instructed to write the modified data as a new data entry to the log head of the log-structure.

15. A method of managing a data storage device, the method comprising:
receiving an instruction to modify first data stored in the data storage device, wherein the data storage device stores a log-structure, the log-structure comprising a log head and segments each storing data entries, each data entry of the data entries comprising a data field storing data and a time parameter indicative of an age of the data stored in the data field, and wherein the first data is stored in the data field of a certain data entry of a certain data segment of the log-structure;
performing a lookup in an index-structure to determine a location of the certain data entry to be modified within the segments of the log-structure;
determining whether a length of the data field of the certain data entry is sufficiently long to accommodate a modification, and if it is determined that the length of the data filed is not sufficiently long, determining whether a next sequential data entry includes sufficient free space to accommodate the modification;
upon determining that the length of the data field of the certain data entry is sufficiently long or the next sequential data entry includes sufficient free space, writing over existing data, or changing the existing data with modified data without appending the modified data to the log head of the log structure, the existing data being stored in the data field of the certain data entry of the certain segment of the log-structure prior to the modification;
upon determining that the length of the data field of the certain data entry is not sufficiently long and the next sequential data entry does not include sufficient free space, appending the modified data to the log head of the log-structure; and
updating the time parameter of the certain data entry and/or the time parameter of the next sequential data entry according to the modified data.

16. The method according to claim 15, wherein the data stored in the data field of the certain data entry is modified without updating a mapping of the index-structure and without updating other data entries in the log-structure.

* * * * *